United States Patent [19]

Tymes

[11] Patent Number: 5,193,201
[45] Date of Patent: Mar. 9, 1993

[54] SYSTEM FOR CONVERTING A RECEIVED MODULATED LIGHT INTO BOTH POWER FOR THE SYSTEM AND IMAGE DATA DISPLAYED BY THE SYSTEM

[76] Inventor: LaRoy Tymes, 4032 Campana Dr., Palo Alto, Calif. 94306

[21] Appl. No.: 512,946

[22] Filed: Apr. 23, 1990

[51] Int. Cl.[5] .................. G06F 1/26; G06F 3/00; G06F 15/74
[52] U.S. Cl. .................. 395/800; 364/706; 364/927.2; 364/948.4; 364/DIG. 2; 359/171
[58] Field of Search .............. 395/800; 364/706; 359/171

[56] References Cited

U.S. PATENT DOCUMENTS

| | | | |
|---|---|---|---|
| 4,393,515 | 7/1983 | de Neumann | 359/171 |
| 4,434,510 | 2/1984 | Lemelson | 359/168 |
| 4,623,869 | 11/1986 | Marubashi | 187/130 |
| 4,742,573 | 5/1988 | Popovic | 359/171 |
| 4,856,090 | 8/1989 | Kitani et al. | 359/159 |
| 4,916,296 | 4/1990 | Streck | 235/454 |
| 5,075,792 | 12/1991 | Brown et al. | 359/152 |

*Primary Examiner*—Thomas C. Lee
*Assistant Examiner*—Paul Harrity
*Attorney, Agent, or Firm*—Flehr, Hohbach, Test, Albritton & Herbert

[57] ABSTRACT

A data processing system has a host computer which is coupled to a light source. The light source illuminates an area surrounding said light source and also transmits data sent to it by the host computer by modulating the light that it generates. A multiplicity of small data processing devices use photodiodes to receive both power and data from the light source. The photodiodes generate an electrical voltage which provide power to a microprocessor. A demodulator, coupled to that electrical voltage, detects peaks in the voltage which are interpreted by the microprocessor so as to regenerate the data transmitted by the light source. The microprocessor then interprets the received data and performs a task or command specified by the received data. In one embodiment, the microprocessor is coupled to an LCD display and the received data specifies what data is to be displayed on the LCD display.

8 Claims, 2 Drawing Sheets

SYSTEM FOR CONVERTING A RECEIVED MODULATED LIGHT INTO BOTH POWER FOR THE SYSTEM AND IMAGE DATA DISPLAYED BY THE SYSTEM

The present invention relates generally to photodiodes used for data acquisition and particularly to methods and systems for using such photodiodes both for providing power to a small data processing system and for data acquisition.

BACKGROUND OF THE INVENTION

Silicon photodiodes are used as photo detectors, that is as optical data acquisition devices, in optical data transmission systems. Photodiodes are also used as power sources for small portable electronic devices, such as hand held calculators, as well as higher voltage power sources for satellites and other devices which do not have other sources of power available.

In general, these two uses of photodiodes are normally thought of as being mutually exclusive. The photodiodes used for data acquisition tend to be very small, low capacitance devices which can handle high data transmission rates. The photodiodes used for power generation tend to be large, high capacitance devices because a large diode junction is required to produce a significant amount of power. However, the high capacitance of the power generating photodiodes precludes a high rate of data acquisition. For instance, the photodiode array used to power a small calculator has been found by the inventor to have a typical maximum bandwidth of 300 hertz, which is many orders of magnitude less than the data rates found in typical optical data transmission systems.

The present invention is useful in applications in which relatively low data rates, such as 60 or 120 bits per second, is useful. In particular, the present invention is directed to low power devices which use a photodiode array to eliminate the need for a battery and the need for a keyboard or equivalent input device. Such applications include programmable displays and certain types of security locks.

SUMMARY OF THE INVENTION

In summary, the present invention is a data processing system which has a host computer coupled to a light source. The light source illuminates an area surrounding said light source and also transmits data sent to it by the host computer by modulating the light that it generates.

A multiplicity of small data processing devices use photodiodes to receive both power and data from the light source. The photodiodes generate an electrical voltage which provide power to a microprocessor. A demodulator, coupled to that electrical voltage, detects peaks in the voltage which are interpreted by the microprocessor so as to regenerate the data transmitted by the light source. The microprocessor then interprets the received data and performs a task or command specified by the received data. In one embodiment, the microprocessor is coupled to an LCD display and the received data specifies what data is to be displayed on the LCD display.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
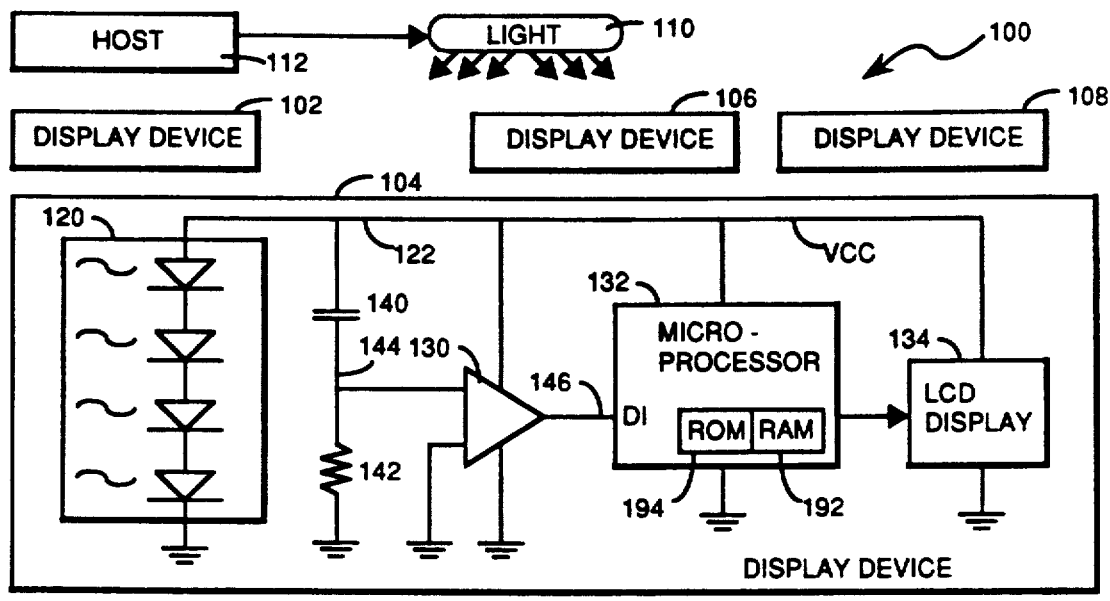
FIG. 1 is a block diagram of a programmable display system incorporating a preferred embodiment of the present invention.

Referring to FIG. 1, there is shown a programmable display system 100 suitable for displaying prices and/or product information in a department store or supermarket. The system includes a multiplicity of display devices 102, 104, 106, 108 which receive both power and data from a fluorescent light source 110. Conceptually, the purpose of the system 100 is to replace the printed price tags on supermarket shelves or on the shelves of a department store with low cost programmable displays. The system eliminates the need to replace printed price tags when product prices are changed. A host computer 112 determines what data is to be transmitted and sends corresponding control signals to the light source 110, which then sends the data to the display devices.

The information displayed by each programmable display 102–108 is sent to these displays by a modulated light source which sequentially "broadcasts" the display data for each of the display devices. Each display device reads in the data that is addressed to that particular device and then displays that data on a liquid crystal display. Furthermore, all the display devices 102–108 are powered by the light emitted by the light source 110, eliminating the need for batteries in the display devices or the need for a power connection to those devices.

Looking at one display device 104 in detail, the device includes a set of photodiodes 120 which receive light from the light source 110 and thereby generate a d.c. voltage on line 122. The voltage on line 122, labelled VCC, will typically vary between 2.4 and 2.8 volts, which is sufficient to provide power to a comparator 130, a microprocessor 132 and an LCD display 134, all of which are coupled to the VCC line 122. Serially connected capacitor 140 and resistor 142 couple the VCC line 122 to the comparator 130, and serve to provide input data received by the photodiodes 120 to the comparator 130.

DATA TRANSMISSION

Figure 2:
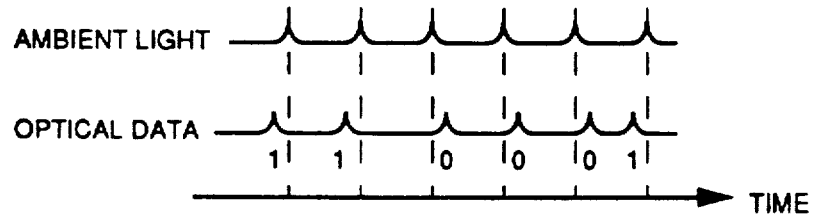
FIG. 2 schematically depicts the waveforms of ambient fluorescent light and fluorescent light containing transmitted data.

The voltage on the VCC line 122 is modulated at a low frequency by peaks and valleys in the intensity of the fluorescent light generated by the light source 110. Referring to FIG. 2, there is shown a first waveform 150 which schematically shows the variation in intensity of light received by a display device over time. Since the light source 110 is powered by a 60 hertz a.c. power source, the fluorescent light generated will have intensity peaks which repeat at a rate of 120 hertz (i.e., once every 8.33 milliseconds).

As shown by the second waveform 152 in FIG. 2, data is transmitted to the display device 104 by delaying and accelerating the intensity peaks in the light waveform. In the preferred embodiment, accelerated peaks which occur earlier than in the ambient or unmodulated light waveform 150 represent "1" data bits and delayed peaks which occur later than in the unmodulated light waveform represent "0" data bits. Of course, in other embodiments of the invention there are other ways that the timing of the peaks could be modulated so as to denote "0" and "1" data bits.

It should be noted that the microprocessor 132 can be programmed to perform time keeping by counting 120 intensity light peaks per second. Thus, each display device 104 can be programmed to keep track of the time of day. This can be useful, for instance, if the user of the display programs all the display devices 104 to update displayed prices at a particular time, such as midnight.

Figure 3:
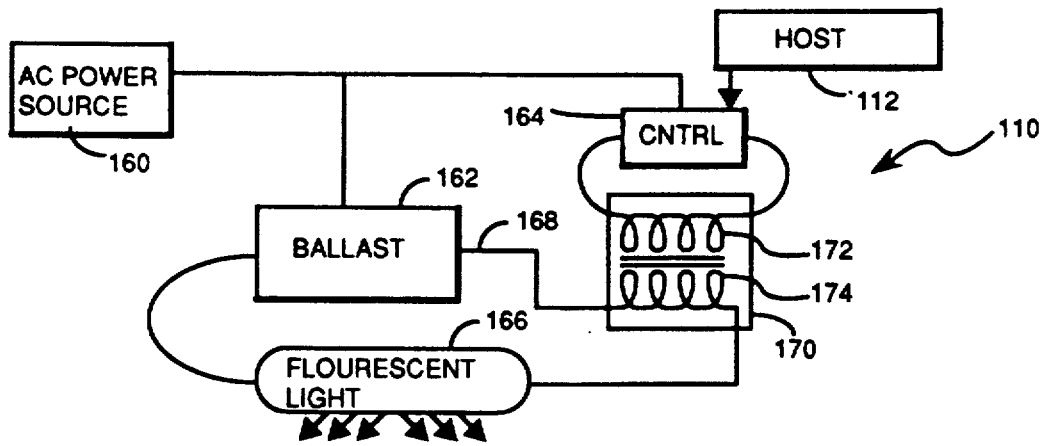
FIG. 3 is a detailed block diagram of a subsystem for transmitting data using a modulated fluorescent light.

FIG. 3 shows a simple light source system for transmitting data to a number of display devices. The light source 110 includes a standard 60 hertz a.c. power source 160, such as the power provided by standard electrical outlets in the United States. The a.c. power source is coupled to a fluorescent light ballast 162 and a controller 164. The ballast 162 is a standard ballast used in conjunction with a fluorescent light bulb 166. The electrical connection 168 between the ballast 162 and the bulb 166 passes through a small transformer 170. The purpose of the transformer is to selectively accelerate and delay the peaks in the a.c. electrical signal transmitted over connection 168.

More particularly, the transformer 170 contains a primary coil 172 and a secondary coil 174. Whenever the host computer 112 sends a "1" bit to the controller 164, it directs current through the primary coil 172 so as to accelerate the next peak in the a.c. signal on line 168, and when the host computer 112 sends a "0" bit to the controller 164, it directs current through the primary coil 172 in the opposite direction so as to delay the next peak in the a.c. signal on line 168. As a result, the intensity peaks in the light generated by the fluorescent light bulb 166 are accelerated and delayed in accordance with the data pattern dictated by the host computer 112.

Figure 4:
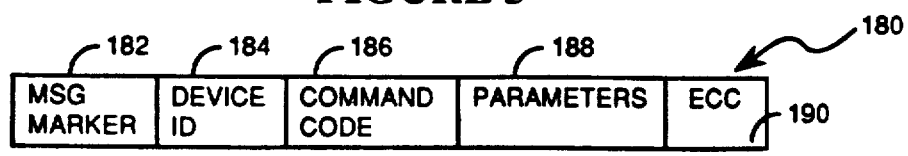
FIG. 4 depicts a data packet transmitted to a programmable display.

Referring to FIG. 4, when a plurality of display devices are being programmed by a single light source 110, it is necessary to format the transmitted data so that only a specified one of the devices uses the transmitted data. Basically, the data must be formatted in the same way as a message being transmitted on a local area network. In general, messages directed at a particular display device 104 are transmitted as a data packet 180. Each transmitted message packet 180 begins with a message marker 182, which is used to mark the beginning of a packet 180 and is also used synchronize the receiving device(s) with the transmitting device. A typical message marker would be a predefined data pattern such as "1110101", which contains a sufficient number of "1" and "0" bits to ensure that the receiving device can synchronize itself with the incoming data. Next, the packet contains a device ID 184, which identifies which display device the message is being sent to. Typically, each display device will have a unique device ID. In addition, a "universal" ID may be used for simultaneously sending a message packet to all the display devices. For instance, the current time may be sent to the all the display devices with a single data packet.

The next part of the data packet is a command code 186, which instructs the receiving device to perform a particular function, such as clearing its display. Next, zero or more parameters 188 are sent, depending on the command code. For instance, if the command is "to display the following string of characters", there will be a parameter 188 which comprises the string of characters to be displayed. Finally, the end of packet 180 contains an error correction code 190, such as the standard Hamming code for detecting one and two bit errors in a message packet and for correcting a one bit error.

RECEIVING AND INTERPRETING TRANSMITTED DATA

In general, the microprocessor 132 in the display device 104 compares the timing of received peaks against that of an unmodulated light waveform and generates a stream of data bits when the timing of the peaks are modulated in accordance with a predefined data transmission pattern.

Referring again to FIG. 1, variations in the intensity of the transmitted fluorescent light cause small corresponding voltage changes on VCC line 122. The resulting a.c. signal is transferred by capacitor 140 onto line 144. The resulting voltages on line 144 are amplified into a three volt signal by comparator 130, which generates signals on line 146 suitable for reading at the data input port of microprocessor 132. Thus the amplifier 130 is functionally a demodulator which regenerates the data transmitted by the light source 110.

The microprocessor continuously monitors line 146 which is coupled to its data input port, reading in a "1" bit during peaks and a "0" bit otherwise. When the time between peaks does not vary for more than a predefined period of time (e.g., 0.5 seconds), the microprocessor assumes that it is receiving unmodulated ambient light. When the timing of the peaks varies from this pattern, it is receiving data in accordance with the pattern shown in FIG. 2. It then interprets the received data in much the same way as a computer coupled to a local area network. If the message is not addressed to the receiving device, the message is ignored. If the message is addressed to the receiving device, it stores the message packet in an internal RAM 192 and upon receipt of a complete message packet it interprets and executes the received command.

In the preferred embodiment, the software used by the microprocessor 132 is stored in an internal ROM (read only memory) 194. As described above, this software's primary function is to detect when data is being received by the device 104, and to receive and interpret message packets. In addition, the software in the ROM 194 enables the device 104 to output image signals to the LCD display 134 corresponding to the received message packets. This software will vary from application to application, and can be easily implemented by anyone skilled in the art. Message packets and other parameters (such as the time of day) are stored in the internal RAM 192.

ALTERNATE EMBODIMENTS

Figure 5:
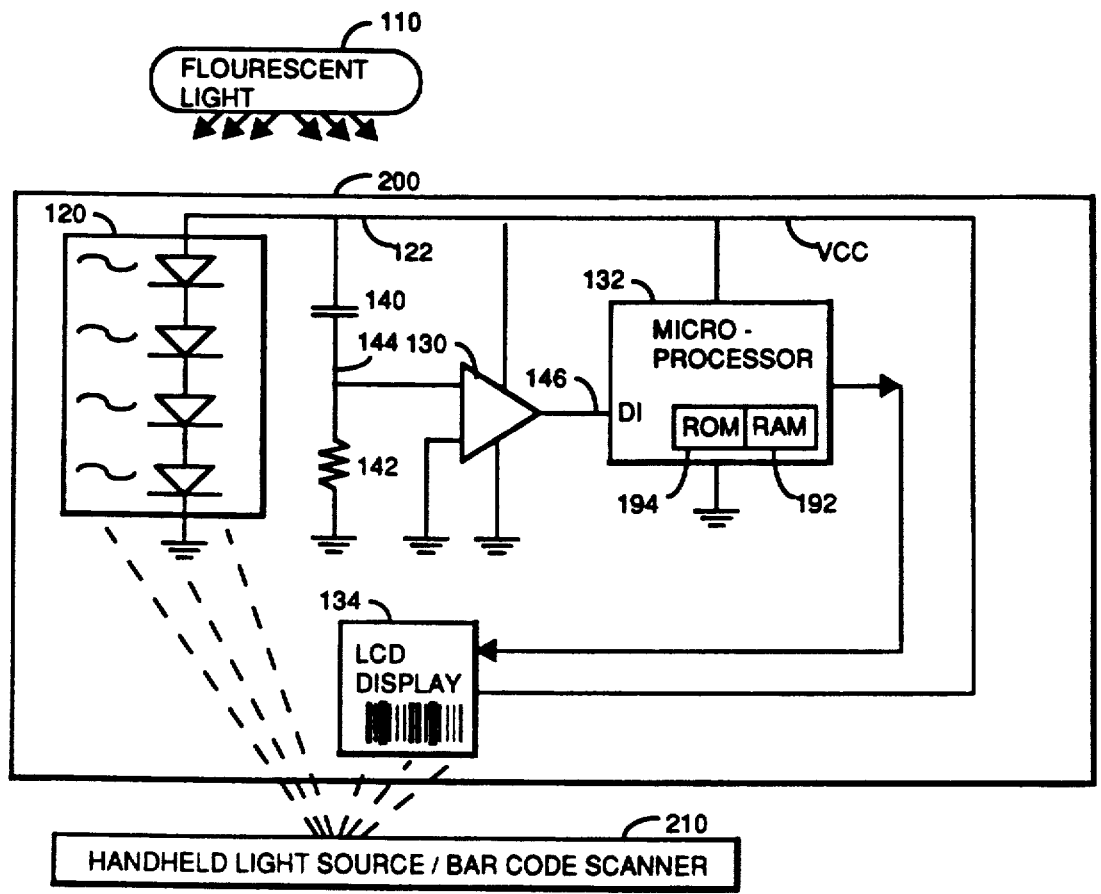
FIG. 5 is a block diagram of an alternate embodiment of a programmable display system in accordance with the present invention.

Referring to FIG. 5, in some embodiments of the present invention it may be desirable to supply data to a receiving device 200 without disturbing the general area lighting system 110. In such a system, data input will generally be accomplished by a handheld light source 210. For instance, if one has a laser bar code scanner which can modulate its laser beam, this beam can input data to a photodiode if it is bright enough to override the ambient light level. Even if it is not very bright compared to the ambient light level, the bar code scanner can be designed to phase modulate the light input to the photodiodes 120 by synchronizing the laser light's modulation with the ambient light.

In this alternate embodiment, the LCD 134 is preferably a relatively high resolution LCD, and the microprocessor 132 is programmed to output information in bar code form when prompted to do so. By aligning the LCD 134 with the photodiodes 120, a laser bar code scanner can be used to read the displayed bar codes on the LCD at the same time, or virtually the same time that it is transmitting commands to the display device via the photodiodes 120. Using a lower resolution LCD 134, the microprocessor 132 can be programmed to sequentially display one or two bar codes at a time in response to commands from the bar code reader, thereby allowing the transfer of data from the display device 104 to the bar code reader 210 even when a low resolution LCD is used.

Figure 6:
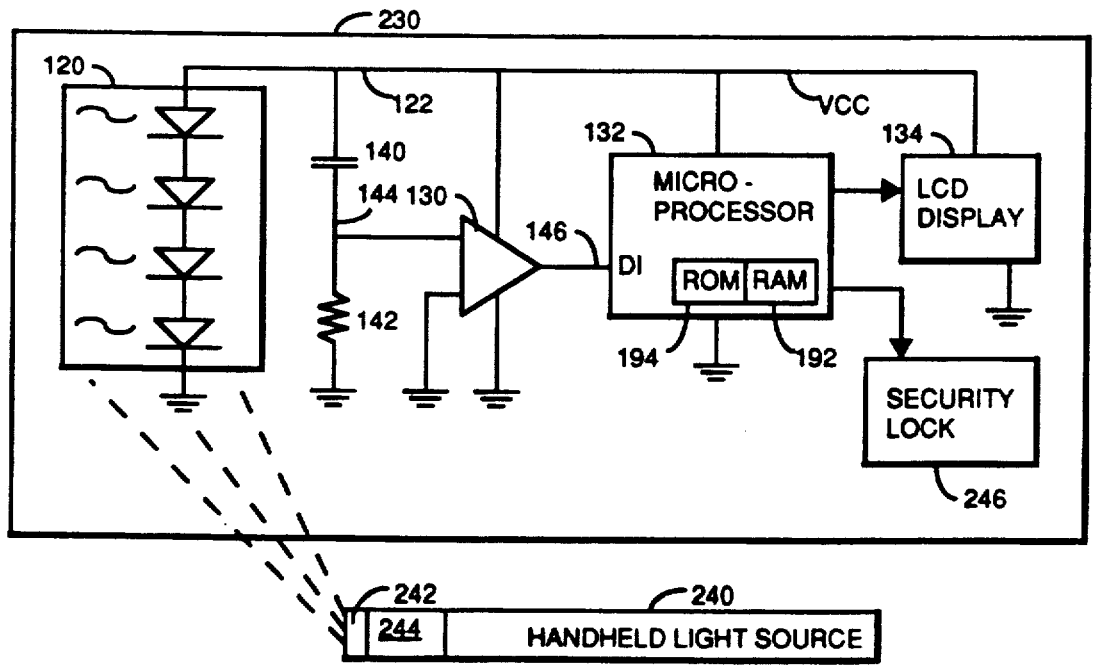
FIG. 6 is a block diagram of another alternate embodiment of the present invention.

Referring to FIG. 6, in another alternate embodiment of the invention, a local light source may be the primary source of power as well as data to apparatus 230. For instance, a flashlight 240 with an incandescent bulb 242 may be used to illuminate the photodiode array 120. A data source and light output modulator 244 in the flashlight (e.g., a microprocessor coupled to a switch) modulates the generated light and thereby supplies data to the microprocessor 132 in the apparatus 230. This may be used to operate an electronically controlled security lock 246, or to operate a monitoring device such as a strain gauge or temperature sensor. In embodiments such as the security lock, the apparatus 230 may not need to have an LCD display 134.

If security lock devices 230 are used in conjunction with the lighting system of the preferred embodiment, a large number of locks or other devices may be turned on and off by a centrally located host computer 112 without having hard wired connections to the controlled devices. The host computer 112 need only be coupled to one or more fluorescent light sources 110 for transmission of message packets.

It is noted that fluorescent light sources 110 are preferred over incandescent light sources because it is relatively difficult to modulate incandescent light sources at data rates in the range of 60 to 300 hertz because of the thermal inertia of the filaments. Therefore, if an incandescent light source is used for data transmission, lower data rates may be necessary.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A data processing device, comprising:
    data processing means, including a data processor, for performing specified data processing tasks;
    photodiode means, coupled to said data processing means, for receiving modulated light and converting said received modulated light into an electrical voltage which provides power to said data processing means; and
    demodulating means, coupled to said photodiode means and said data processing means, for demodulating said electrical voltage so as to generate a stream of data signals, and for transmitting said stream of data signals to said data processing means;
    wherein said data processing tasks performed by said data processing means includes outputting image signals corresponding to said stream of data signals generated by said demodulating means;
    said data processing device further including display means, coupled to said data processing means, for displaying images corresponding to said image signals output by said data processing means, said display means being coupled to said photodiode means, whereby said photodiode means powers said display means by said electrical voltage generated from said photodiode means.

2. The data processing device set forth in claim 1, further including light source means for generating light and illuminating said photodiode means, said light source means including means for transmitting a specified stream of data by modulating said generated light.

3. A data processing system, comprising:
    light source means for generating light and thereby illuminating an area surrounding said light source means, said light source means including means for transmitting a specified stream of data by modulating said generated light; and
    a data processing device, including:
        data processing means, including a data processor, for performing specified data processing tasks;
        photodiode means, coupled to said data processing means, for receiving said modulated light generated by said light source means and converting said received modulated light into an electrical voltage which provides power to said data processing means; and
        demodulating means, coupled to said photodiode means and said data processing means, for demodulating said electrical voltage so as to regenerate said stream of data transmitted by said means for transmitting and transmitting said regenerated stream of data to said data processing means;
        said data processing means including means for receiving and interrupting said regenerated stream of data transmitted by said demodulating means;
    wherein said data processing tasks performed by said data processing means includes outputting image signals corresponding to said regenerated stream of data transmitted by said demodulating means;
    said data processing device further including display means, coupled to said data processing means and powered by said electrical voltage from said photodiode means, for displaying images corresponding to said image signals output by said data processing means.

4. The system set forth in claim 3, wherein said light source means includes at least one fluorescent lamp powered by an a.c. power source, and means for modulating light generated by said at least one fluorescent lamp by controlling when amplitude peaks in the light generated by said at least one fluorescent lamp are generated to transmit said stream of data.

5. The system set forth in claim 3, wherein said light source means includes a portable incandescent lamp with means for modulating light generated by said lamp so as to transmit said stream of data.

6. A data processing system, comprising:
- a host computer, including means for storing and transmitting data;
- light source means coupled to said host computer for generating light which illuminates an area surrounding said light source means, said light source means including means for receiving said data transmitted by said host computer and for retransmitting said data by modulating said generated light; and
- a multiplicity of data processing devices, each said data processing device including:
  - data processing means, including a data processor, for performing specified data processing tasks;
  - photodiode means, coupled to said data processing means, for receiving said modulated light generated by said light source means and converting said received modulated light into an electrical voltage which provides power to said data processing means; and
  - demodulating means, coupled to said photodiode means and said data processing means, for demodulating said electrical voltage, regenerating said data transmitted by said light source means, and transmitting said regenerated data to said data processing means;
  - said data processing means including means for receiving and interrupting said regenerated stream of data transmitted by said demodulating means;
  - wherein said data processing tasks performed by said data processing means includes outputting image signals corresponding to said regenerated data transmitted by said demodulating means;
  - each said data processing device further including display means, coupled to said data processing means, for displaying images corresponding to said image signals output by said data processing means, said display means being coupled to said photodiode means, whereby said photodiode means powers said display means by said electrical voltage generated from said photodiode means.

7. The system set forth in claim 6, wherein said light source means includes at least one fluorescent lamp powered by an a.c. power source, and means for modulating light generated by said at least one fluorescent lamp by controlling when amplitude peaks in the light generated by said at least one fluorescent lamp are generated to retransmit said data.

8. The system set forth in claim 6, wherein said light source means includes a portable lamp with means for modulating light generated by said lamp so as to transmit said data.

* * * * *